US008086448B1

(12) United States Patent
Goodwin et al.

(10) Patent No.: US 8,086,448 B1
(45) Date of Patent: Dec. 27, 2011

(54) DYNAMIC MODIFICATION OF A HIGH-ORDER PERCEPTUAL ATTRIBUTE OF AN AUDIO SIGNAL

(75) Inventors: Michael Goodwin, Scotts Valley, CA (US); Carlos Avendano, Campbell, CA (US); Ramkumar Sridharan, Capitola, CA (US); Martin Wolters, Nuremburg (DE)

(73) Assignee: Creative Technology Ltd, Singapore (SG)

(*) Notice: Subject to any disclaimer, the term of this patent is extended or adjusted under 35 U.S.C. 154(b) by 1059 days.

(21) Appl. No.: 10/812,494

(22) Filed: Mar. 29, 2004

Related U.S. Application Data

(63) Continuation-in-part of application No. 10/606,196, filed on Jun. 24, 2003, and a continuation-in-part of application No. 10/606,373, filed on Jun. 24, 2003.

(51) Int. Cl.
*G01L 11/04* (2006.01)

(52) U.S. Cl. .................. 704/206; 381/1; 381/2; 381/17; 381/18; 381/19; 381/20; 381/21; 381/22; 381/23; 381/307

(58) Field of Classification Search .................. 381/1–2, 381/17–23, 307; 704/206
See application file for complete search history.

(56) References Cited

U.S. PATENT DOCUMENTS

| | | | | |
|---|---|---|---|---|
| 4,574,389 | A * | 3/1986 | Schotz | 381/10 |
| 5,208,860 | A * | 5/1993 | Lowe et al. | 381/17 |
| 5,544,248 | A * | 8/1996 | Date | 381/56 |
| 5,774,844 | A * | 6/1998 | Akagiri | 704/230 |
| 6,047,253 | A * | 4/2000 | Nishiguchi et al. | 704/207 |
| 6,521,447 | B2 * | 2/2003 | Zou et al. | 435/287.2 |
| 6,741,706 | B1 * | 5/2004 | McGrath et al. | 381/22 |
| 6,934,593 | B2 * | 8/2005 | Fontana et al. | 700/94 |
| 7,228,190 | B2 * | 6/2007 | Dowling et al. | 700/94 |
| 2001/0026513 | A1 * | 10/2001 | Koyata | 369/47.26 |
| 2002/0037057 | A1 * | 3/2002 | Kroeger et al. | 375/329 |
| 2002/0072902 | A1 * | 6/2002 | Gerlach et al. | 704/229 |
| 2002/0110264 | A1 * | 8/2002 | Sharoni et al. | 382/118 |
| 2002/0164151 | A1 * | 11/2002 | Jasinschi et al. | 386/69 |
| 2003/0091194 | A1 * | 5/2003 | Teichmann et al. | 381/2 |
| 2003/0125933 | A1 * | 7/2003 | Saunders et al. | 704/201 |
| 2004/0016338 | A1 * | 1/2004 | Dobies | 84/662 |
| 2004/0044525 | A1 * | 3/2004 | Vinton et al. | 704/224 |
| 2004/0068412 | A1 * | 4/2004 | Chu et al. | 704/503 |
| 2004/0073422 | A1 * | 4/2004 | Simpson et al. | 704/225 |

(Continued)

FOREIGN PATENT DOCUMENTS

WO PCT/US03/17788 12/2003

OTHER PUBLICATIONS

Yellin et al., Mulitchannel Signal Separation: Methods and Analysis, Jan. 1996, IEEE Transactions on Signal Processing, vol. 44, pp. 106-118.*

(Continued)

*Primary Examiner* — Jakieda Jackson
(74) *Attorney, Agent, or Firm* — Creative Technology Ltd

(57) ABSTRACT

Processing an audio signal associated with a sound recording made available to be rendered to an end user is disclosed. The audio signal is received. A high-order perceptual attribute of the audio signal as rendered is changed by modifying the audio signal. The modification may be based on real-time analysis of the audio signal.

65 Claims, 7 Drawing Sheets

U.S. PATENT DOCUMENTS

| | | | | |
|---|---|---|---|---|
| 2004/0223543 | A1 * | 11/2004 | Tsai | 375/232 |
| 2004/0252851 | A1 * | 12/2004 | Braun | 381/101 |
| 2004/0260540 | A1 * | 12/2004 | Zhang | 704/205 |
| 2005/0080616 | A1 * | 4/2005 | Leung et al. | 704/200.1 |

OTHER PUBLICATIONS

Carlos Avendano and Jean-Marc Jot: *Ambience Extraction and Synthesis from Stereo Signals for Multi-Channel Audio Up-Mix*; vol. II—1957-1960: © 2002 IEEE.

Jean-Marc Jot and Carlos Avendano: *Spatial Enhancement of Audio Recordings*; AES 23rd International Conference, Copenhagen, Denmark, May 23-25, 2003.

Carlos Avendano: *Frequency-Domain Source Identification and Manipulation in Stereo Mixes for Enhancement, Suppression and Re-Panning Applications*; 2003 IEEE Workshop on Applications of Signed Processing to Audio and Acoustics; Oct. 19-22, 2003, New Paltz, NY.

U.S. Appl. No. 10/163,158, filed Jun. 4, 2002, Avendano et al.

U.S. Appl. No. 10/163,168, filed Jun. 4, 2002, Avendano et al.

Sonic Focus Help Topics, Using Sonic Focus, http://sonicfocus.com/help/using_sf.html.

Sonic Focus Help Topics, Sonic Focus Product Description. http://sonicfocus.com/help/prod_desc.html.

* cited by examiner

DYNAMIC MODIFICATION OF A HIGH-ORDER PERCEPTUAL ATTRIBUTE OF AN AUDIO SIGNAL

CROSS REFERENCE TO RELATED APPLICATIONS

This application is a continuation in part of co-pending U.S. patent application Ser. No. 10/606,196 entitled TRANSIENT DETECTION AND MODIFICATION IN AUDIO SIGNALS, filed Jun. 24, 2003, which is incorporated herein by reference for all purposes; and copending U.S. patent application Ser. No. 10/606,373 entitled ENHANCING AUDIO SIGNALS BY NON-LINEAR SPECTRAL OPERATIONS, filed Jun. 24, 2003, which is incorporated herein by reference for all purposes.

This application is related to co-pending U.S. patent application Ser. No. 10/738,361 entitled AMBIENCE EXTRACTION AND MODIFICATION FOR ENHANCEMENT AND UPMIX OF AUDIO SIGNALS, filed Dec. 17, 2003, which is incorporated herein by reference for all purposes; and co-pending U.S. patent application Ser. No. 10/738,607 entitled EXTRACTING AND MODIFYING A PANNED SOURCE FOR ENHANCEMENT AND UPMIX OF AUDIO SIGNALS filed Dec. 17, 2003, which is incorporated herein by reference for all purposes. Co-pending U.S. patent application Ser. No. 10/812,845 entitled MAPPING CONTROL SIGNALS TO VALUES FOR ONE OR MORE INTERNAL PARAMETERS filed concurrently herewith, is incorporated herein by reference for all purposes.

FIELD OF THE INVENTION

The present invention relates generally to signal processing. More specifically, dynamic modification of a perceptual attribute of an audio signal is disclosed.

BACKGROUND OF THE INVENTION

A sound recording rarely, if ever, gives a listener the exact same experience as he or she would have had had the listener been present when the sound recording was made. The reasons may include placement, limitations, and/or characteristics of the equipment used to record the sound as originally generated (e.g., a spoken or musical performance in a sound studio or live performance venue); intended and/or unintended effects of the process by which the final sound recording was produced (e.g., processing either performed or not performed and/or other decisions made in the mixing and mastering process); differences between the space in which the sound recording is rendered and the space in which the sound was originally generated and recorded; and limitations and/or characteristics of the playback equipment used to render the audio data embodied in the sound recording to a listener.

Any one or combination of the above factors or possibly other factors may result in a listening experience that does not satisfy fully the subjective taste of a particular listener in one or more respects. For example, the sound recording as rendered may have a high-order perceptual attribute that is not pleasing to the listener, or may lack a high-order perceptual attribute desired by the listener, or the high-order perceptual attribute may be present to a degree not fully pleasing to the listener. As used herein, a “high-order perceptual attribute” is a characteristic of an audio signal associated with a sound recording as rendered to a listener that depends both on (1) the content of the audio signal, as determined both by the original sound recorded to make the sound recording and any processing performed in producing the final sound recording made available to be rendered to the listener, and (2) the characteristics of the playback equipment used to render the audio signal and the effects of any further processing performed on the audio signal prior to its being rendered to the listener. A high-order perceptual attribute is distinguishable from gross attributes, such as loudness, or the presence of noise and/or other unwanted components or artifacts, in that a high-order perceptual attribute describes fine distinctions in the manner in which the essential components of the audio signal are reproduced and rendered while maintaining the basic integrity of the underlying performance, much like the right combination of herbs and spices can bring out different aspects of the flavor of a food or a carefully selected stain can highlight (or deemphasize or mask) features in the grain of a piece of wood in a particular desired way. A high-order perceptual attribute is “perceptual” in the sense that it is discernable to at least a trained or skilled listener, and such a listener can describe at least in relative terms the extent which it is present or not in an audio signal as rendered using reasonably precise language that by usage or convention conveys to other listeners the extent to which a particular recognizable quality is present. Examples of such high-order perceptual attributes as they have been described in sound recording and audio equipment literature, for example, include “punch” (good reproduction of dynamics and good transient response with strong impact); “presence” or “closeness” (the sense that a particular instrument, e.g., is present in the listening room); “warmth” (easy on the ears, not harsh); “spaciousness” (conveying a sense of space, ambiance, or room around the instruments and/or other sound sources); “fatness” (fullness of sound, increased energy in the upper bass region); and “clarity” or “transparency” (easy to hear into the music; detailed, not distorted). Such attributes are inherently subjective and, as such, the rough definitions provided in parentheses above are provided only by way of example.

Once a sound recording has been set in a tangible medium, such as a compact disc or an MP3 or other digital file, or otherwise made available for distribution to and/or use by one or more end listeners, the high-order perceptual attributes of the sound recording in the past have been considered to be fixed, with each end listener having to accept the attributes of the sound recording as provided. Gross tools have been provided to enable users to affect to some limited degree the manner in which a sound recording is rendered, such as a volume control to adjust the loudness, noise reduction technologies to reduce noise, and tools such as bass and treble controls and equalizers to enhance or attenuate sound in particular frequency bands, but many such tools apply the same modification to an audio signal associated with a sound recording regardless of the audio content or otherwise are capable of making only gross adjustments to an audio signal as rendered, and as such are inadequate to affect or provide high-order perceptual attributes, such as those described above. Therefore, there is a need for a way to allow an end listener to modify an audio signal associated with a sound recording in a way that changes a high-order perceptual attribute of the audio signal as rendered.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Modification of a high-order perceptual attribute of an audio signal is disclosed. An audio signal is received and a high-order perceptual attribute of the audio signal as rendered is changed by modifying the audio signal. In some embodiments, the modification is based at least in part on real-time analysis of the content of the audio signal.

Figure 1A:
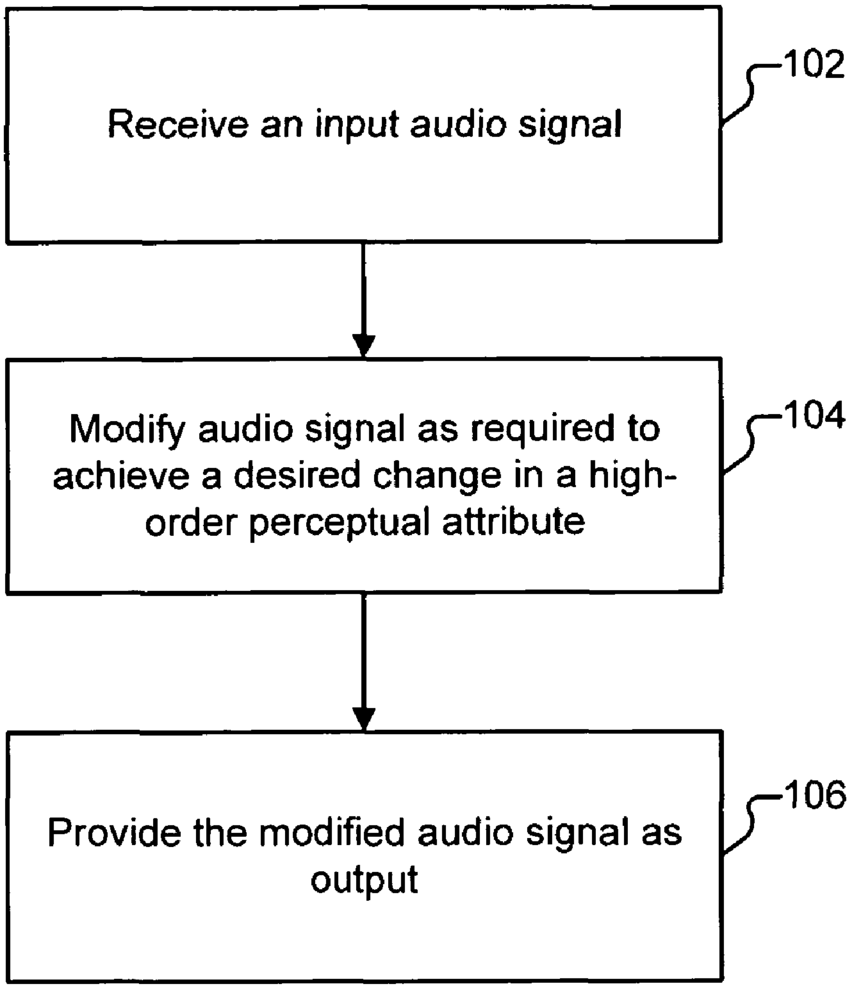
FIG. 1A is a flow chart illustrating a process used in one embodiment to change a high-order perceptual attribute of an audio signal.

FIG. 1A is a flow chart illustrating a process used in one embodiment to change a high-order perceptual attribute of an audio signal. In step 102, the audio signal is received. In step 104, the audio signal is modified to achieve a desired change in the high-order perceptual attribute of the audio signal as rendered. In step 106, the modified audio signal is provided as output.

Figure 1B:
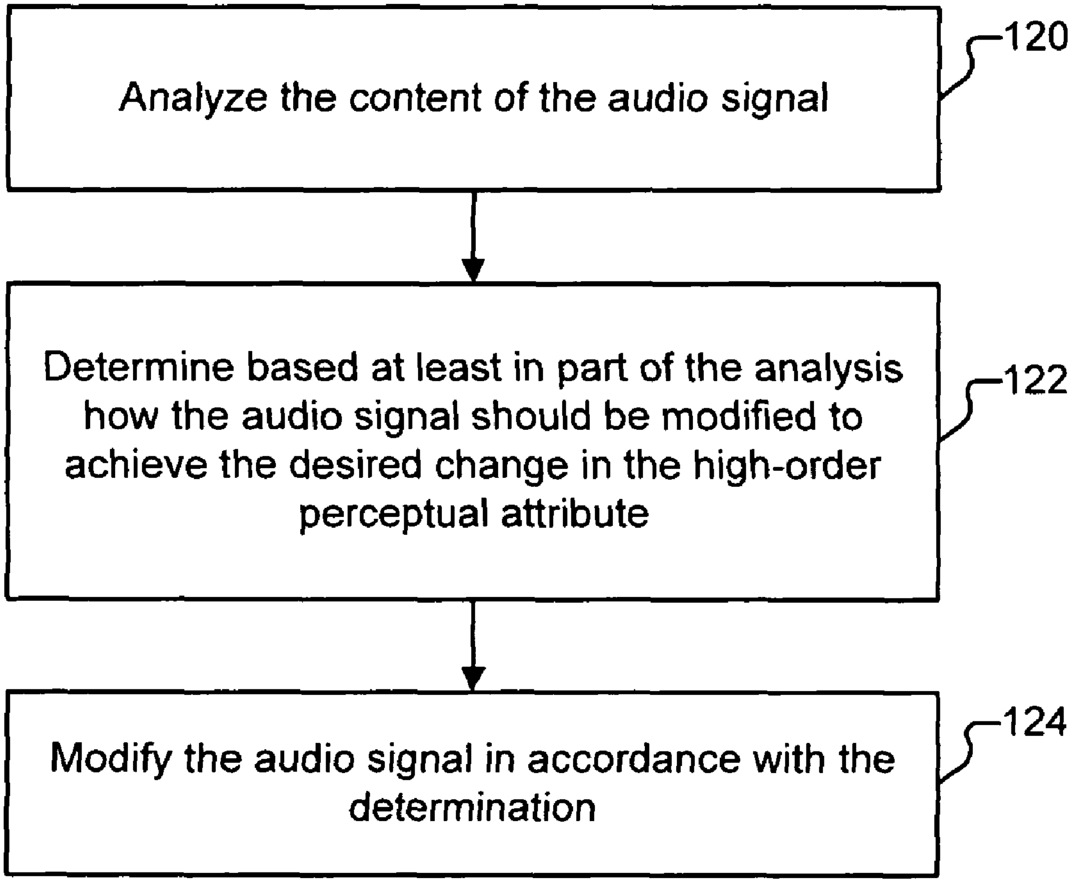
FIG. 1B is a flow chart illustrating a process used in one embodiment to modify an audio signal to achieve a desired change in a high-order perceptual attribute of the audio signal as rendered, as in step 104 of FIG. 1A.

FIG. 1B is a flow chart illustrating a process used in one embodiment to modify an audio signal to achieve a desired change in a high-order perceptual attribute of the audio signal as rendered, as in step 104 of FIG. 1A. In step 120, the content of the audio signal is analyzed. In some embodiments, step 120 may comprise analyzing the signal in the time domain, the frequency domain, and/or a time-frequency domain. In step 122, it is determined based at least in part on the analysis performed in step 120 how the audio signal should be modified to achieve the desired change in the high-order perceptual attribute. In some embodiments, step 122 may comprise determining the value of a modification factor, exponent, or other coefficient, variable, or parameter based at least in part on the analysis performed in step 120. In step 124, the audio signal is modified in accordance with the determination made in step 122.

Figure 1C:
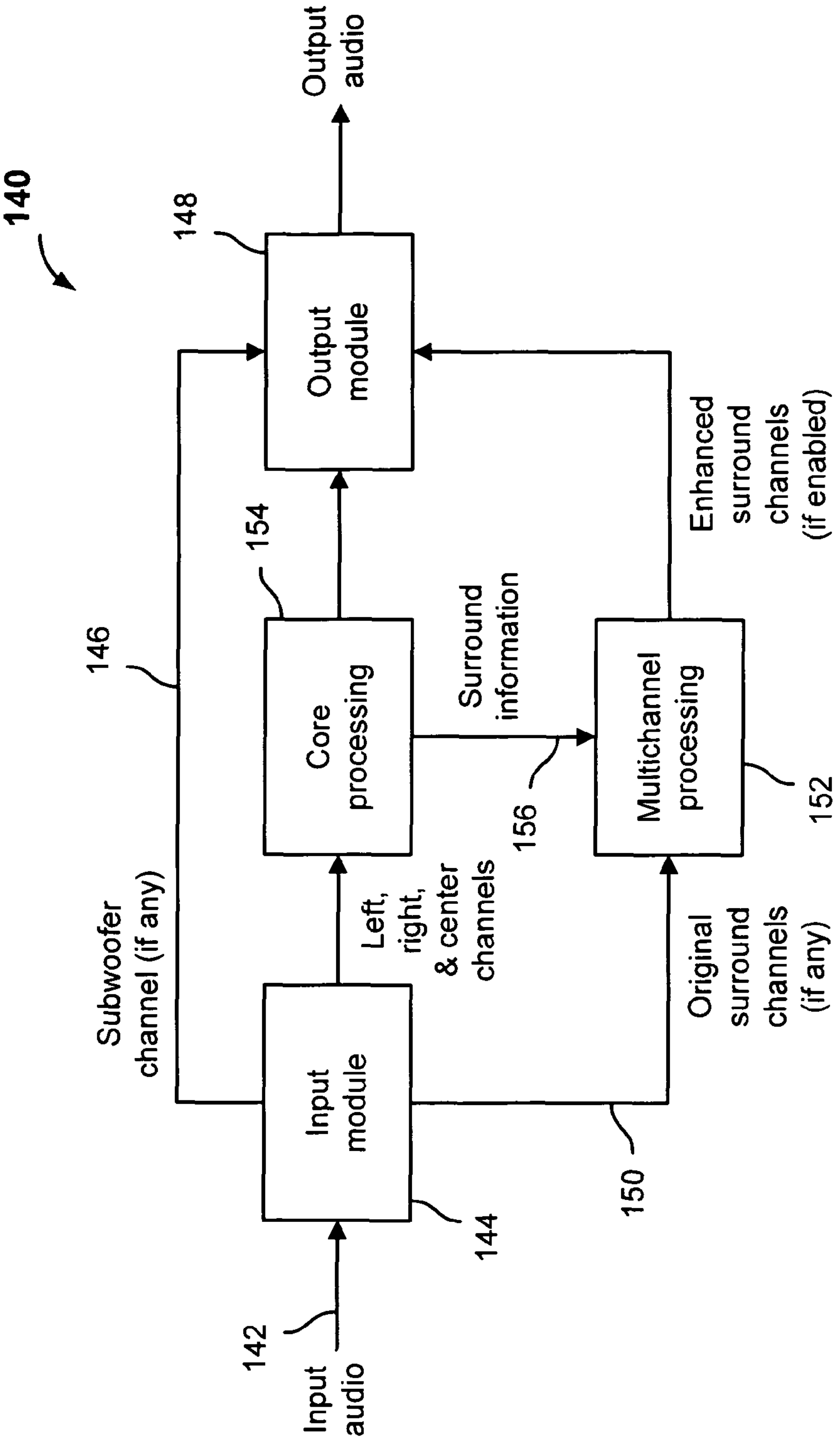
FIG. 1C is a block diagram illustrating an audio signal processing system used in one embodiment to change a high-order perceptual attribute of an audio signal.

FIG. 1C is a block diagram illustrating an audio signal processing system used in one embodiment to change a high-order perceptual attribute of an audio signal. The audio signal processing system 140 receives an audio signal on input 142 to input module 144. If the audio signal includes a subwoofer channel, that channel is sent by input module 144 via subwoofer bypass 146 to output module 148. In one alternative embodiment, processing may be applied to the subwoofer channel, if present. In one such embodiment the subwoofer bypass 146 is omitted and the subwoofer channel is supplied instead to the core processing module 154. In one alternative embodiment, the subwoofer channel is supplied to a separate subwoofer processing module for processing and the output of the subwoofer processing module is provided to the output module 148. In one such embodiment, the core processing module 154 provides "bass information" to the subwoofer processing module, which processes the subwoofer channel based at least in part on the bass information. If the audio signal includes surround channels, in the embodiment shown in FIG. 1C such channels are sent by input module 144 via link 150 to a multichannel processing module 152. In one alternative embodiment, the surround channels are supplied to and processed by the core processing module 154 and the multichannel processing module 152 is omitted. Input module 144 sends the left, right, and center channels of the audio signal, as applicable, to core processing module 154. In one embodiment, multichannel processing module 152 and core processing module 154 are configured to modify the audio signal as required to achieve a desired change in one or more high-order perceptual attributes of the audio signal. Core processing module 154 provides as output on link 156 surround channel information generated using the left, right, and center channels received by core processing module 154 from input module 144. Multichannel processing module 152 uses the original surround channels, if any, received on link 150 and the surround information received on link 156 to generate enhanced surround channels (if enabled), which are provided via link 158 to output module 148. Core processing module 154 is configured to modify the left, right, and center channels, as applicable, as required to achieve a desired change in one or more high-order perceptual attributes of the audio signal. In some embodiments, the processing performed by multichannel processing module 152, core processing module 154, and/or any other general and/or channel-specific processing module that may be included in embodiments other than the one shown in FIG. 1C may comprise transient detection and modification as described in U.S. patent application Ser. No. 10/606,196, incorporated herein by reference above, non-linear spectral operations as described in U.S. patent application Ser. No. 10/606,373, incorporated herein by reference above, ambience extraction and modification as described in U.S. patent application Ser. No. 10/738,361, incorporated herein by reference above, and/or panned source extraction and modification as described in U.S. patent application Ser. No. 10/738,607, incorporated herein by reference above. In some embodiments, the surround information provided by core processing module 154 on link 156 is generate at least in part based on ambience components extracted as described in U.S. patent application Ser. No. 10/738,361, incorporated herein by reference above. In one embodiment, core processing module 154 may be configured to modifying the surround information prior to providing it as output on link 156, such as by enhancing or attenuating an extracted ambience component comprising such surround information, in order to achieve a desired level of one or more high-order perceptual attributes of the audio signal. In one embodiment, the multiprocessing module 152 may be configured to perform such modification in addition to or instead of the core processing module 154.

Figure 2:
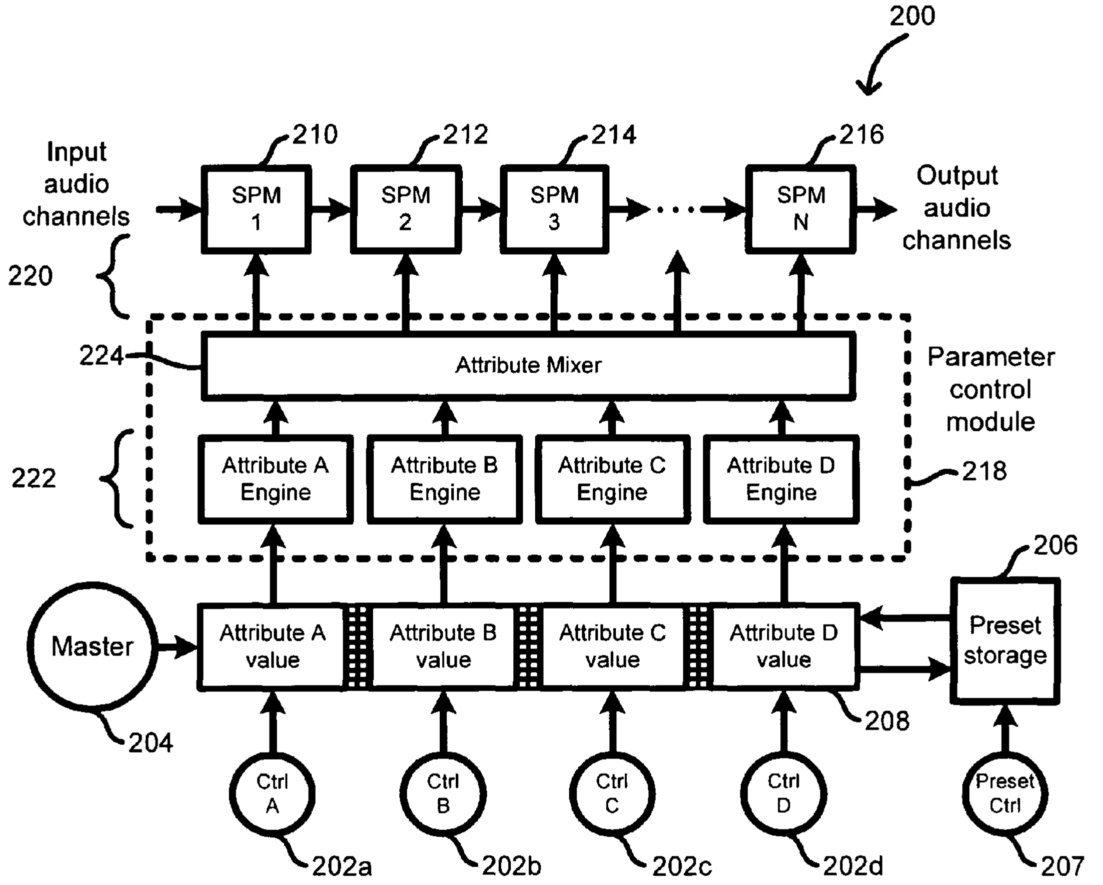
FIG. 2 is a block diagram of a core processing module and associated control interface used in one embodiment.

FIG. 2 is a block diagram of a core processing module and associated control interface used in one embodiment. The system 200 comprises a plurality of perceptual attribute controls 202*a*-202*d*. Each of the perceptual attribute controls 202*a*-202*d* may be configured to receive an input from a user indicating a desired level for a high-order perceptual attribute associated with the control, such as "punch", "warmth", etc., indicated in FIG. 2 as perceptual attributes A-D. A master control 204 may optionally be included to allow a user to simultaneously adjust the level of all four perceptual attributes A-D. A preset storage 206 may optionally be provided to enable the storage of one or more factory and/or user designated preset values for the respective attribute controls 202*a*-202*d*. A preset control 207 may optionally be provided to enable a user to select a set of preset values for the attribute controls. An attribute value generation block 208 comprises a plurality of attribute-specific modules each configured to generate a value for the attribute control with which it is associated based on a level indicated via the individual attribute control, the master control, or a preset stored in preset storage 206. The system 200 comprises a plurality of signal processing modules 210, 212, 214, and 216, which as indicated in FIG. 2 may comprise any number of signal processing modules. Each signal processing module may in one embodiment be used to perform a different type of processing on the audio signal, such as by operating on a different feature or component of the audio signal (e.g., transients, other spectral events, vocal components, other panned sources, ambience, etc.). In one embodiment, the SPMs may be configured to transform the audio signal into a time-frequency domain, or some other domain, in which linear or non-linear modifications may be applied to the audio signal based at least in part on an analysis of the spectral content of each portion, as described more fully below and in the U.S. Patent Applications incorporated herein by reference above.

A parameter control module 218 receives as input the individual attribute values generated by the attribute value generation block 208 based on the user-provided settings of the individual perceptual attribute controls 202*a*-202*d* and/or the master control 204. The parameter control module 218 processes the attribute values to generate a set of signal processing module (SPM) parameters 220, which are provided as inputs to the signal processing modules 210-216.

In one embodiment, the SPM parameters 220 comprise one or more SPM-specific parameters for each SPM. More than one attribute value provided by the attribute value generation block 208 may map to an indicated or desired value for a particular SPM parameter. For example, an attribute control for "punch" and one for "warmth" may both be associated with corresponding values for one or more parameters to an SPM configured to enhance or suppress transients. In fact, a high setting for both "punch" and "warmth" might tend to pull the "transient" SPM in opposite directions. In the embodiment shown, the parameter control module 218 is configured to combine such potentially conflicting user inputs to generate a single combined or reconciled value for each SPM parameter. In the embodiment shown, the parameter control module 218 comprises a plurality of attribute engines 222, one for each perceptual attribute for which an attribute value is received. The respective attribute engines 222 are configured to map the attribute value received from the attribute value generation block 208 for the attribute to a set of one or more SPM parameter values, for one or more different signal processing modules, that correspond to the desired level for the perceptual attribute. The parameter control module 218 further includes an attribute mixer 224. The attribute mixer 224 is configured to receive from the respective attribute engines 222 the SPM parameter values corresponding to the attribute values associated with each respective attribute and to combine and/or reconcile any conflicts by generating a combined value for any SPM parameter for which more than one value has been generated by the attribute engines 222, for example because two different attribute values mapped to a value for the same SPM parameter. If only one attribute maps to a value for a particular SPM parameter, the attribute mixer 224 includes that value, along with any combined and reconciled values, in a combined and reconciled set of SPM parameter values. The attribute mixer 224 provides the combined and reconciled set of SPM parameter values to the SPMs, which process the audio signal based at least in part on the values of the parameters.

In some embodiments, the SPMs 210-216 may comprise one or more signal processing modules such as those described in the co-pending U.S. Patent Applications incorporated herein by reference above. Examples of SPM parameters described in said applications include gains; exponents; slopes; coefficients; modification factors; and maximum, minimum, and/or threshold values for these or other SPM parameters.

In an alternative embodiment, one or more sets of "system-level" presets may be stored in a "system-level preset storage" area or device, not shown in FIG. 2A, to enable the selection or other use of a set of preset values for the internal parameters used by the signal processing modules 210-216. In such an embodiment, if a system-level preset is selected or otherwise used the parameter control module 218 of FIG. 2A is bypassed and the internal parameter values of the system-level preset are provided as inputs directly to the signal processing modules 210-216.

In the manner described above, and discussed in more detail in co-pending U.S. patent application Ser. No. 10/812,845, incorporated herein by reference above, control signals indicating a desired level for one or more high-order perceptual attributes may be mapped to one or more parameters for one or more signal processing modules to cause the signal processing modules to modify the audio signal, as required, to achieve the respective desired levels of the high-order perceptual attributes.

By way of example, controls for the high-order perceptual attributes "punch" and "presence" might work in the following manner. In one embodiment, an increase in "punch" would get mapped to an decreased sensitivity for a transient detection module, an increased modification intensity for a transient modification module, an increased enhancement of the upper bass spectral region in a bass management module, and a suppression of ambience components in an ambience modification module in order to emphasize the direct signal components. In one embodiment, increased "presence" would get mapped to an increased sensitivity for a center-panned source identification and extraction module, an increased modification intensity for identified center-panned sources in a source modification module, and a decrease in the modification intensity in a transient modification module for signal components identified as center-panned so that the processing of center-panned transients would not introduce undesirable artifacts.

Figure 3:
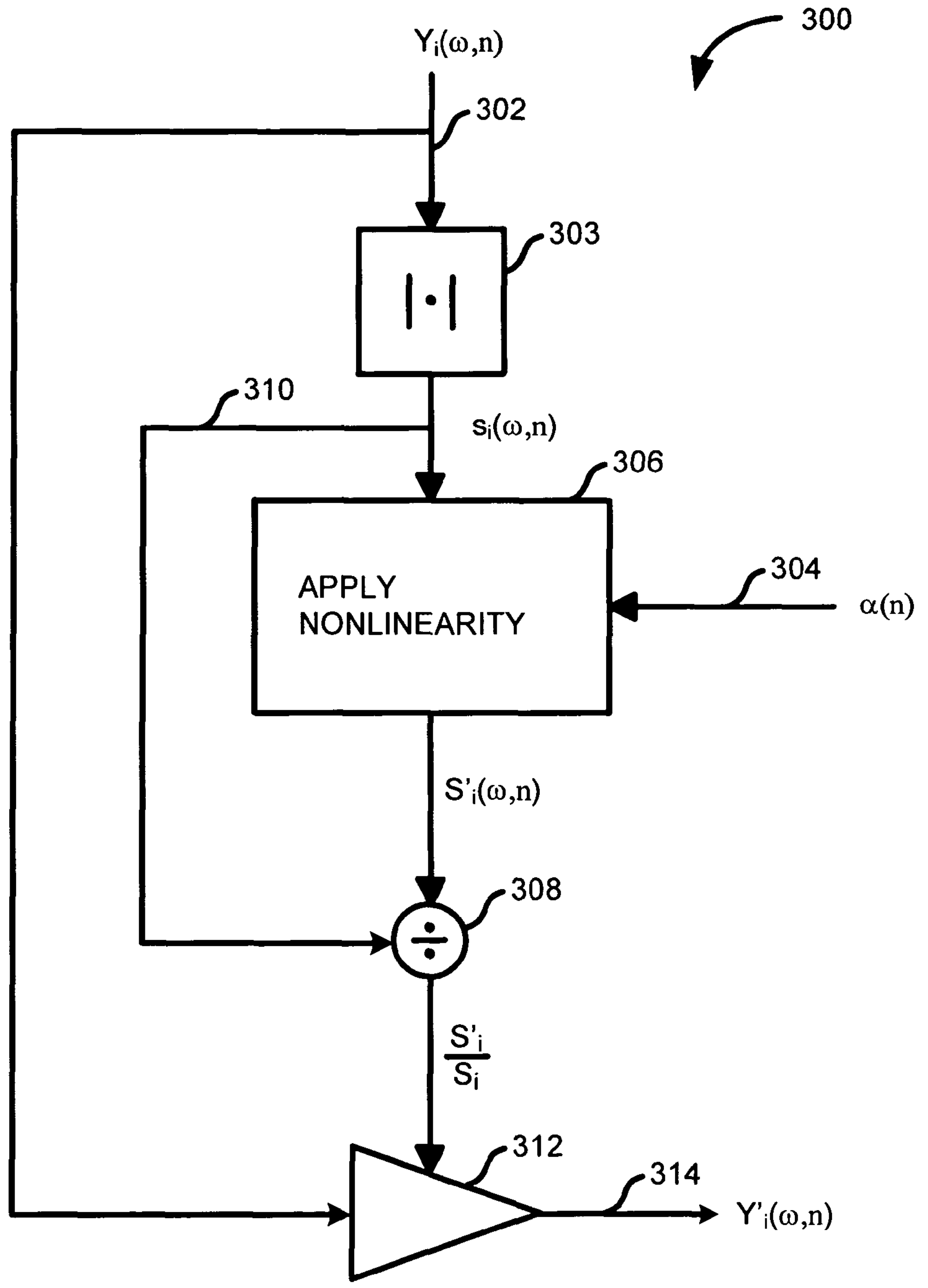
FIG. 3 is a block diagram of elements of a signal processing module for modifying transients.

In one embodiment, as noted above changing the level of one or more high-order perceptual attributes of an audio signal may require detection and modification of transient audio events, as described in U.S. patent application Ser. No. 10/606,196 (the ’196 Application), incorporated herein by reference above. In one embodiment, one of the signal processing modules 210-216 of FIG. 2 may comprise a transient detection and modification module such as described in the ’196 Application. FIG. 3 is a block diagram of elements of a signal processing module for modifying transients. The signal modification block 300 receives on line 302 a series of short time Fourier transform (STFT) results $Y_i(\omega, n)$ for successive frames “n” of an incoming audio signal y(t). In one embodiment, the STFT results are obtained by processing the signal y(t) using a subband filter bank. In other embodiments, subband filter banks other than a bank configured to yield STFT results may be used to transform the signal y(t). In one embodiment, the audio signal y(t) comprises a plurality of channels, and the subscript “i” in the notation “$Y_i(\omega, n)$” indicates the STFT results for a particular channel “i” of the signal y(t). In one such embodiment, modification of the audio signal is performed channel by channel, such that a nonlinear signal modification block such as signal modification block 300 is provided for each channel. The STFT results $Y_i(\omega, n)$ are provided to a spectral magnitude determination block 303 configured to determine the spectral magnitude values $S_i(\omega, n)$ for the corresponding STFT results for frame “n” and channel “i”. The modification block 300 also receives as an input on line 304 a modification factor α(n). In one embodiment, the value of the modification factor α(n) is determined as described in the ’196 Application and may be determined at least in part by a user or other control input indicating a desired level for one or more high-order perceptual attributes. In one embodiment, the value of the modification factor α(n) is determined at least in part by making a “soft decision” regarding the extent to which the portion (e.g., frame) of the audio signal to which the modification is being applied is associated with a transient audio event. A soft decision as used herein means something other than a hard, binary decision that a portion of the audio signal either should or should not be modified, e.g., by determining that some portions are not associated with a transient audio event and that others are, and then applying the same modification to all the latter portions. For example, as described in the ’196 Patent, spectral flux or some other metric determined for each portion of the audio signal based on a real-time analysis of the signal may be used to determine the extent to which a portion of the audio signal is associated with a transient audio event, such that the modification factor has a lower value for portions of the audio signal in which the spectral content has not changed very much as compared to a preceding portion and a higher value for portions of the audio signal in which the spectral content has changed by a greater amount. Other SPMs may be configured to modify an audio signal in accordance with a soft decision based on metrics other than spectral flux. The modification block 300 comprises an apply nonlinearity sub-block 306, which is configured to receive the modification factor α(n) and the spectral magnitude values $S_i(\omega, n)$ as inputs. As shown in FIG. 3, the apply nonlinearity sub-block 306 is configured to provide as output a series of modified spectral magnitude values $S_i'(\omega, n)$. In one embodiment, the apply nonlinearity sub-block 306 is configured to calculate a modified spectral magnitude value $S_i'(\omega, n)$ for each frame “n” by using the corresponding value of the modification factor α(n) to calculate a nonlinear modification of the value $S_i(\omega, n)$. In one embodiment, the nonlinear modification is determined in accordance with the following equation:

$$S'(\omega,n)=[S(\omega,n)+1]^{\alpha(n)}-1 \qquad [1]$$

In one embodiment, the above equation [1] is used to insure that for values of the modification factor α(n) greater than 1 the modified spectral magnitude value S'(ω, n) will always be greater than the corresponding unmodified spectral magnitude value S(ω, n) even if S(ω, n) is less than 1. In such an embodiment, the value of α(n) greater than 1 will always result in enhancement of a transient audio event (such as may be desired by a listener who prefers sharper transients). Conversely equation [1] will always result in a reduction or deemphasis of transient audio events for values of the modification factor α(n) between zero and 1, regardless of the value of S(ω, n), such as may be desired by a listener who prefers smoother transients (i.e., a listening experience in which transient audio events are smoothed out and/or otherwise deemphasized).

In one alternative embodiment, the nonlinear modification is determined in accordance with the following equation:

$$S'(\omega, n) = \left[A \cdot \frac{S(\omega, n)}{S_{max}(n)} + 1\right]^{\alpha(n)} - 1 \qquad [2]$$

where in one embodiment $S_{max}(n)$ is the maximum magnitude value S(ω, n) for the frame “n” and “A” is a coefficient the value of which is determined in one embodiment by a sound designer, e.g., based on the characteristics of the system in which the signal processing module will be used, expected user preferences, etc. In one alternative embodiment, S(n) is the maximum magnitude value S(ω, n) over a range of frames that includes the frame “n” and a number of previous frames. Equation [2] may be particularly appropriate in a system in which a gain or scaling factor may be applied to the audio signal prior to its being provided to the signal processing module, e.g., to facilitate other processing to be applied to the signal.

In other embodiments, equations other than equation [1] or equation [2] may be used to apply the modification factor α(n) to modify a transient audio event. For example, and without limitation, linear expansion or compression of the signal (e.g., multiplying the magnitudes S(ω, n) by the modification factor α(n)) or simple nonlinear expansion or compression of the signal (e.g., raising the magnitudes S(ω, n) to the exponent α(n)), or any variation of and/or combination of the two, may be used.

For nonlinear modification methods, the relative effect of the modification may depend on the absolute level of the signal. In some embodiments, this is not desirable, especially in systems for which the input can exhibit a wide dynamic range and for which a consistent modification is desired for any signal level. The division by $S_{max}(n)$ in equation [2] is a normalization approach for nonlinear modifications used in one embodiment such that the overall effect of the modification will be independent of the signal level. Incorporating such normalization in the modification function simplifies the task of the system designer and/or the sound designer, e.g. in that the design decisions that a sound designer makes to specify a high-order perceptual attribute are not dependent on the absolute level of the signals which the designer is using in the design process.

Referring further to FIG. 3, the apply nonlinearity sub-block 306 is configured to provide the modified spectral magnitude values $S_i'(\omega, n)$ to a division sub-block 308. The division sub-block 308 is also configured to receive as an input on line 310 the unmodified spectral magnitude values $S_i(\omega, n)$, and to calculate for each frame "n" a modification ratio $S_i'(\omega, n)$ divided by $S_i(\omega, n)$. The modification ratio calculated by division sub-block 308 is provided as an input to amplifier 312. The amplifier 312 also receives for each frame of the audio signal the STFT result $Y_i(\omega, n)$. In other embodiments, subband or time-frequency representations other than the STFT are used. The amplifier 312 is configured to multiply the STFT result $Y_i(\omega, n)$ for each frame "n" by its corresponding modification ratio $S_i'(\omega, n)/S_i(\omega, n)$ determined by division sub-block 308 to provide as output on line 314 a modified STFT result $Y'_i(\omega, n)$ for each successive frame "n" of channel "i". In one embodiment, calculating a modified spectral value $S_i'(\omega, n)$ and using that value to determine the modification ratio by operation of a division sub-block such as division sub-block 308, and then applying that modification ratio to the STFT result $Y_i(\omega, n)$, enables the modification ratio to be calculated and a modified STFT value to be determined in a manner that modifies only the magnitude of the STFT and preserves the phase information embodied in the STFT results $Y_i(\omega, n)$. While FIG. 3 illustrates an embodiment in which the modification ratio and modified STFT result are determined on a per channel basis, in one alternative embodiment the modification ratio may be determined based on a combined signal and then applied to each channel.

While a transient modification SPM is described in detail above with respect to FIG. 3, any group of one or more SPMs may be used to modify an audio signal to achieve a desired level for one or more high-order perceptual attributes, including without limitation by modifying portions of the audio signal characterized by a rapid change in spectral content, and identifying and modifying portions of the audio signal associated with a particular component or sound source, such as a vocal component, ambience, individual instruments, or any panned source. Using the approach described herein, a user has the ability to navigate a multi-dimensional high-order perceptual attribute space to achieve a desired overall listening experience with respect to an audio signal as rendered. For each high-order perceptual attribute, one or more of the types of modifications described herein and/or other or different modifications may be applied to the audio signal in order to achieve the desired level for each high-order perceptual attribute.

Figure 4:
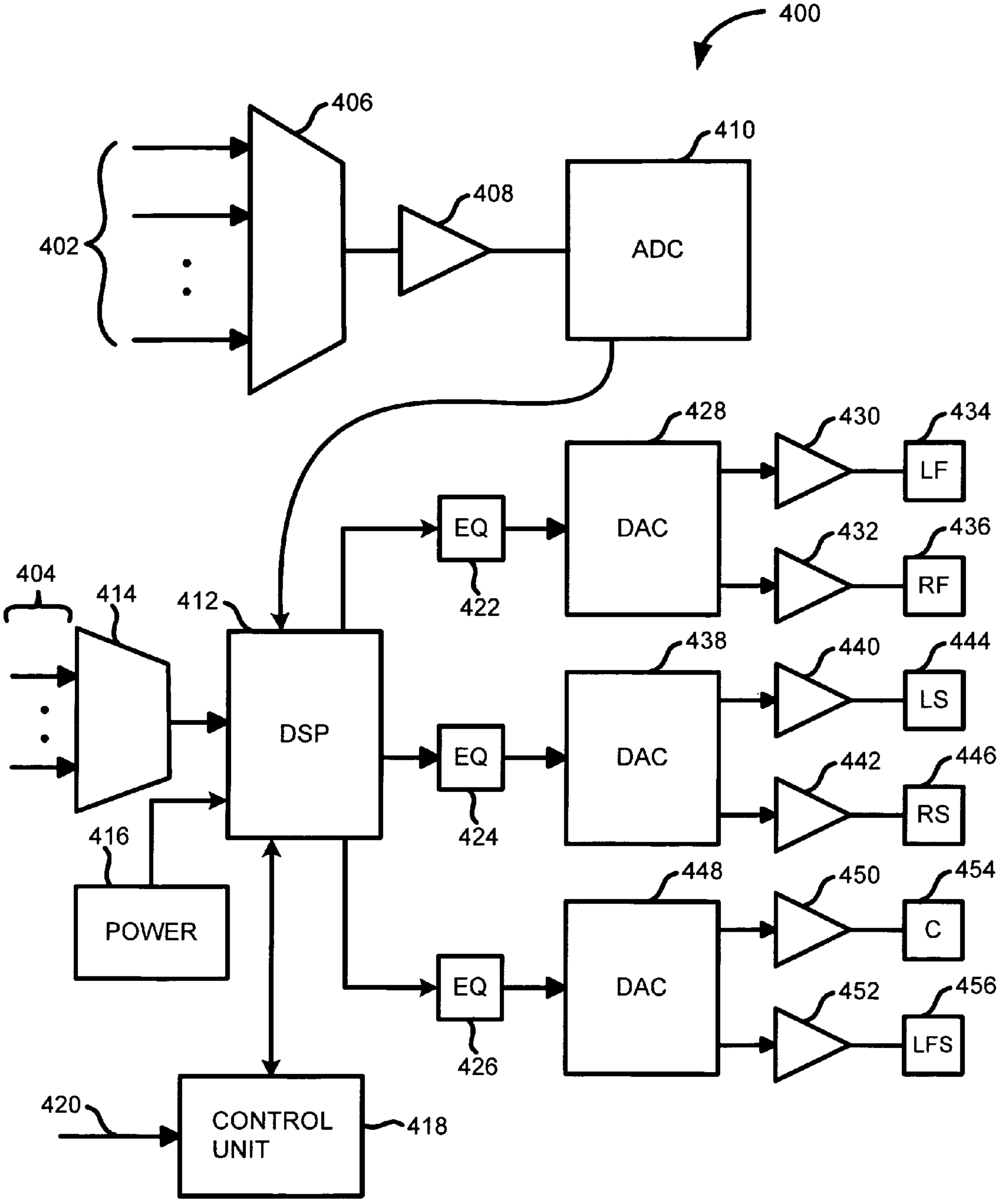
FIG. 4 is a block diagram of a home theater audio system used in one embodiment.

The approach described herein may be implemented in any number of ways, including without limitation as software, hardware, or some combination of software and hardware associated with any device or system configured to process audio signals, e.g., a sound card, software running on a CPU, or any suitable processing component or device. By way of example, and without limitation, the approach described herein may be implemented as part of a home theater or other home audio system. FIG. 4 is a block diagram of a home theater audio system used in one embodiment. The audio system 400 is configured to receive audio signals from a plurality of potential sources, including legacy inputs 402 (e.g., legacy CD players, VCR's, etc.) and digital sources 404 that provide audio signals in a format suitable for digital signal processing without pre-processing (e.g., DVD, STP, etc.). The legacy inputs 402 are routed through a de-multiplexer 406 and an amplifier 408 to an analog-to-digital converter (ADC) 410. The ADC 410 processes the audio signal and sends the signal to the digital signal processing (DSP) block 412. The digital sources 404 are routed via a de-multiplexer 414 directly to the DSP block 412. In the embodiment shown, any decoding that may be required to convert the audio signal into a format suitable for digital signal processing as described herein is performed by DSP block 412. In other embodiments, such decoding may be performed prior to the audio signal reaching DSP block 412, such as by a transcoder. In some embodiments, all or part of the processing described herein may be performed on the audio signal prior to decoding. The DSP block 412 receives power and power-related control signals (e.g., reset) from power supply and management block 416. The processing performed by the DSP block 412 is controlled by a control unit 418 based on one or more control signals 420. In one embodiment, the control unit 418 and DSP block 420 may be implemented as shown in FIG. 2. The DSP block 412 provides as output, as applicable (e.g., depending on the content of the audio signal as received, such as the number and type of channels, and the processing indicated by the control signals 420, such as whether to generate or enhance surround or other channels), to digital equalizers 422, 424, and 426. Equalizer 422 sends its output to the digital-to-analog converter (DAC) 428 for delivery via amplifiers 430 and 432, respectively, to left front speaker 434 and right front speaker 436. Equalizer 424 provides its output to a digital-to-analog converter 438 for delivery via amplifiers 440 and 442, respectively, to left surround speaker 444 and right surround speaker 446. Finally, equalizer 426 sends its output to digital-to-analog converter 448 for delivery via amplifiers 450 and 452, respectively, to center speaker 454 and low frequency speaker 456. In some embodiments, amplifiers 430, 432, 440, 442, 450, and 452 may be integrated into a single power amplifier component or device. Other embodiments may comprise more, fewer, or different components than those shown in FIG. 4, depending on the system (e.g., more or fewer speakers, more or fewer inputs and/or types of input, different components, different configuration, etc.). In other embodiments, the audio signal may be modified by a processing device or module included in a component, such as an amplifier, player, or receiver.

In one embodiment, the approach described herein may be used to simulate on a low-end (i.e., less expensive) component or system the listening experience provided by a high-end (i.e., more expensive) audio system or component. At least certain such high-end systems have been described by audiophiles as rendering audio signals in a way characterized by one or more high-order perceptual attributes. An example of such a high-end component is a high-end tube amplifier, which can cost thousands of dollars. In one embodiment, to simulate on a less expensive system the listening experience afforded by a high-end tube amplifier, a sound designer is employed to design a preset group of parameters to a signal processing system such as described herein, in which the combination of parameter values results in an input audio signal being modified and rendered such that the high-order perceptual attributes associated with the tube amplifier are approximated. In one embodiment, the preset values comprise internal parameter values suitable for use directly in the signal processing module(s), e.g., the inputs 220 of FIG. 2, such that it is not necessary to map individual attribute control signals to internal input signals for such a preset. In one embodiment, the preset values may instead comprise levels for individual attribute controls, such as described above in connection with preset storage 206 and preset control 207 of FIG. 2.

A similar approach may be used to provide one or more presets to be used to offset undesirable characteristics of a particular type of system or component, such as to remove artifacts or other effects known to be associated with a particular system or component. In this way, the listening experience provided by a less expensive system or component, or one that has some other advantage apart from the undesirable characteristic, may be improved. For example, a preset could be provided to offset an undesirable characteristic known to be associated with a particular model of stereo receiver or amplifier sold by a particular company, and all those who own or wish to purchase the receiver or amplifier could use the preset to offset the undesirable trait. Other components the deficiencies of which could be offset as described herein include without limitation sound cards, portable and non-portable audio players, loudspeaker systems and components, and headphones systems and components.

In one embodiment, the techniques described herein are used to offset the negative effects of audio compression. In one such embodiment, the techniques described herein are applied at least in part by a digital signal processing component integrated into an audio compression codec.

Figure 5:
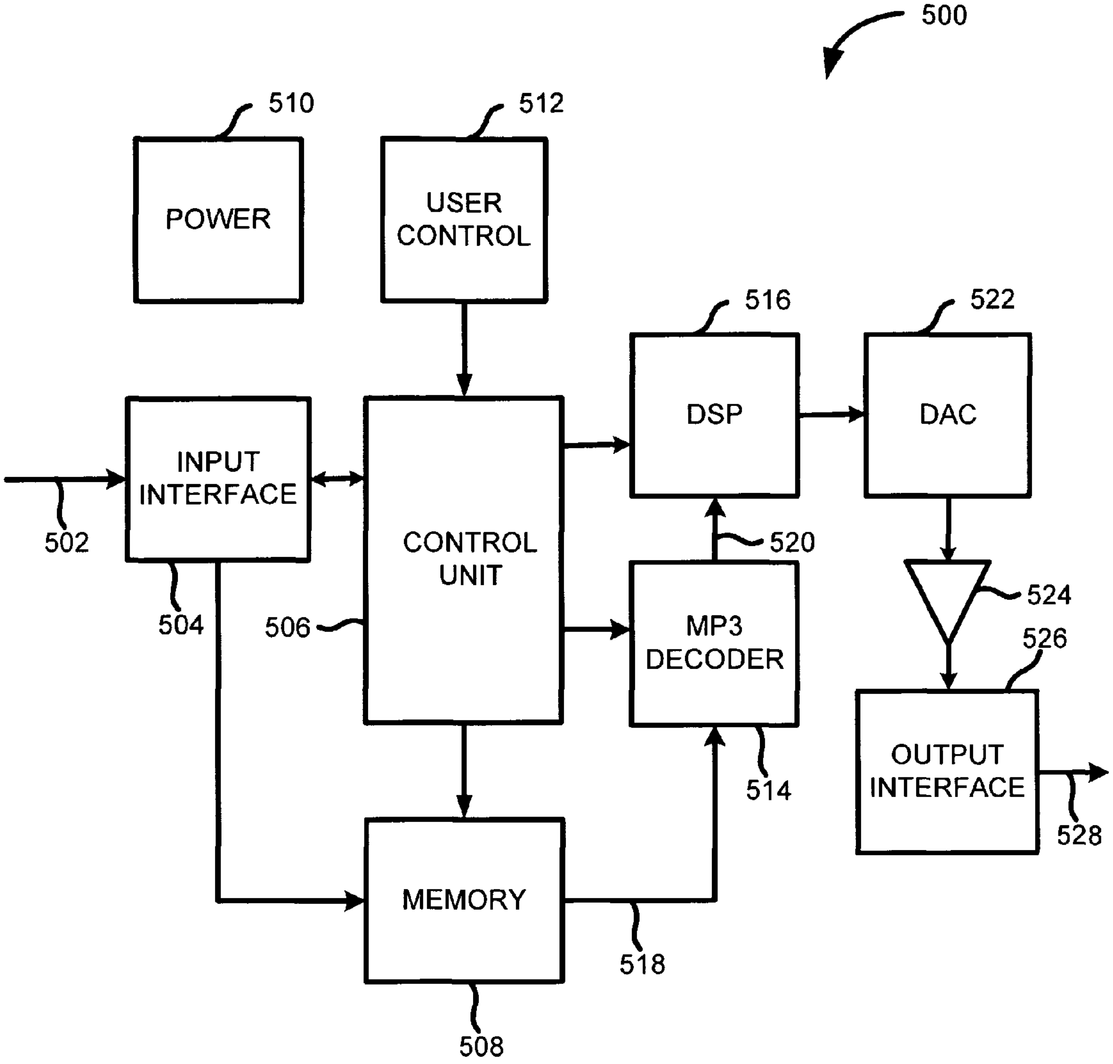
FIG. 5 is a block diagram of an MP3 player configured to modify an audio signal to achieve a desired level for one or more high-order perceptual attributes.

Other potential commercial or consumer product embodiments include, without limitation, portable music players. FIG. 5 is a block diagram of an MP3 player configured to modify an audio signal to achieve a desired level for one or more high-order perceptual attributes. The player 500 comprises an input connection 502 configured to supply an audio signal to an input interface 504. Input interface 504 is connected to and controlled by a control unit 506. Input interface 504 also has a connection to a memory 508 configured to buffer and/or store, under control of control unit 506, audio signal content received via input interface 504. A power module 510 supplies power to those components of player 500 that require power, via connections not shown in FIG. 5. User control module 512 is configured to receive external control inputs (not shown), such as may be generated by a control on a user interface and to provide corresponding control signals to the control unit 506. In one embodiment, a user may use controls associated with control module 512 to indicate a desired level for one or more high-order perceptual attributes. The control unit 506 is connected to and provides control signals to MP3 decoder 514 and digital signal processing (DSP) module 516. In one alternative embodiment, all or part of the processing performed by DSP module 516 may be performed prior to decoding, in which case the audio signal may be routed to the DSP module 516 for processing prior to being decoded by the MP3 decoder 514. In response to the control signals supplied by the user control module 512, such as a file selection and/or "play" command, the control unit 506 causes an audio signal to be supplied from memory 508 via link 518 to MP3 decoder 514 for decoding. The decoded audio signal is supplied to the DSP module 516 via link 520 where it is processed in accordance with control signal received from control unit 506. In one embodiment, the control signal supplied by control unit 506 to DSP module 516 may comprise one or more attribute control signals such as those supplied to the parameter control module 218 of FIG. 2. In one embodiment, the parameter control module may comprise part of the control unit 506, and the control signals supplied by control unit 506 to DSP module 516 may comprise the internal parameters 220 of FIG. 2. The DSP module 516 modifies the audio signal, e.g., to achieve a desired level for one or more high-order perceptual attributes in the audio signal as rendered. The modified audio signal is supplied to a digital to analog converter (DAC) 522, which converts the audio signal to analog and supplies the analog signal via an amplifier 524 to an output interface 526. In some embodiments, the amplifier 524 may be omitted. The output interface 526 provides the modified audio signal as output on output connection 528, e.g., to a speaker, headphones, earpiece, or other rendering device. While FIG. 5 shows an MP3 player, the techniques described herein may be applied to any portable or non-portable audio player configured to render any type of audio signal using any coding format.

Numerous other commercial or consumer product embodiments are possible, including without limitation mobile telephones; personal digital assistants; digital cameras and video recorders and playback systems; pagers; other types of wireless and/or personal electronic devices; and any device capable of being configured to process and render an audio signal.

The approaches described herein could be implemented and configured in any number of ways. For example, one or more processing components configured to implement the approaches described herein may be integrated into a consumer or other electronic device, such as a receiver, amplifier, portable or non-portable audio playback device, etc. Such a processing component(s) may also be implemented as a standalone device or module, e.g., connected between a receiver and an amplifier. In other embodiments, a CPU or other processor may be configured to implement the techniques described herein, e.g., by running software configured to implement the techniques, such as a user application or driver software. In other embodiments, one or more integrated circuits or processors (e.g., custom chip set, ASIC, or DSP) on a motherboard or other printed circuit board may be configured to perform the processing described herein. Combinations of one or more of these and/or other techniques may also be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing an audio signal of a sound recording made available to be rendered to an end user, the audio signal being for at least one channel, the method comprising:

receiving the audio signal of the sound recording;

analyzing the content of the audio signal of the sound recording to determine a modification to the audio signal which when applied causes a high-order perceptual attribute of the audio signal to change; and changing the high-order perceptual attribute of the audio signal as rendered by modifying the audio signal, wherein modifying the audio signal comprises applying to the audio signal the modification based at least in part on said analysis of the content of the audio signal;

wherein the analyzing and changing steps are performed on the audio signal on a channel by channel basis; and wherein the high-order perceptual attribute includes a characteristic associated with rendered sound that depends on (1) the content of the audio signal, including an original sound captured when making the sound recording and any processing performed on the original sound to produce the sound recording, and (2) at least one undesirable characteristic of a playback device used to render the audio signal of the sound recording.

2. The method of claim 1, wherein analyzing the content of the audio signal comprises transforming the audio signal into a time-frequency domain.

3. The method of claim 2, wherein analyzing the content of the audio signal comprises analyzing the spectral content of the audio signal.

4. The method of claim 2, wherein analyzing the content of the audio signal comprises detecting an audio event in the audio signal.

5. The method of claim 4, wherein the audio event comprises a transient event.

6. The method of claim 4, wherein the audio event comprises a rapid change in spectral content.

7. The method of claim 1, wherein analyzing the content of the audio signal comprises identifying a component of the audio signal.

8. The method of claim 7, wherein applying analysis-based processing to the audio signal further comprises modifying the identified component.

9. The method of claim 7, wherein the identified component comprises a sound source.

10. The method of claim 7, wherein the identified component comprises a panned source.

11. The method of claim 7, wherein the identified component comprise an ambience component.

12. The method of claim 7, wherein the identified component comprises a vocal component.

13. The method of claim 7, wherein the identified component comprises a component associated with an instrument.

14. The method of claim 1, further comprising providing the modified audio signal as output.

15. The method of claim 1, wherein modifying the audio signal comprises:

applying to the audio signal a modification based at least in part on a decision concerning whether a particular portion of the audio signal is associated with an audio event being detected; and modifying each portion to an extent determined at least in part by the result of the decision.

16. The method of claim 1, wherein modifying the audio signal comprises:

applying to the audio signal a modification based at least in part on a soft decision concerning the extent to which a particular portion of the audio signal is associated with an audio event being detected; and modifying each portion to an extent determined at least in part by the result of the soft decision.

17. The method of claim 1, further comprising receiving from the end user an input indicating a desired level for the high-order perceptual attribute.

18. The method of claim 1, further comprising receiving from the end user via a continuous user control an input indicating a desired level for the high-order perceptual attribute.

19. The method of claim 1, further comprising receiving from the end user a preset selection indicating a desired level for the high-order perceptual attribute.

20. The method of claim 1, further comprising:

receiving an input from the end user;

wherein the modification is further based at least in part on said input received from the end user.

21. The method of claim 1, wherein the modification is further based at least in part on one or more parameters determined in advance by a sound designer.

22. The method of claim 1, wherein modifying the audio signal comprises making a decision concerning whether a particular portion of the audio signal is associated with a particular component of the audio signal.

23. The method of claim 1, wherein modifying the audio signal comprises making a soft decision concerning the extent to which a particular portion of the audio signal is associated with a particular component of the audio signal.

24. The method of claim 1, wherein the high-order perceptual attribute comprises a first high-order perceptual attribute that comprises one of a plurality of high-order perceptual attributes and further comprising:

receiving from the end user for each of said plurality of high-order perceptual attributes a user input indicating a desired level for the high-order perceptual attribute; and modifying the audio signal as required to achieve with respect to each of said plurality of high-order perceptual attributes the desired level indicated by the corresponding user input for the high-order perceptual attribute.

25. The method of claim 1, wherein changing a high-order perceptual attribute of the audio signal comprises compensating for deficiencies in a rendering component used to render the audio signal.

26. The method of claim 25, wherein the rendering component comprises an amplifier.

27. The method of claim 25, wherein the rendering component comprises a sound card.

28. The method of claim 25, wherein the rendering component comprises a portable audio player.

29. The method of claim 25, wherein the rendering component comprises an audio compression codec.

30. The method of claim 25, wherein the rendering component comprises a loudspeaker system or component.

31. The method of claim 25, wherein the rendering component comprises a headphone system or component.

32. The method of claim 1, wherein changing a high-order perceptual attribute of the audio signal comprises modifying the signal such that the audio signal as rendered by a low-end audio component has with respect to each of one or more high-order perceptual attributes a level typically associated with a high-end audio component.

33. The method of claim 32, wherein the low-end component comprises an amplifier.

34. The method of claim 32, wherein the low-end component comprises a sound card.

35. The method of claim 32, wherein the low-end component comprises a portable audio player.

36. The method of claim 32, wherein the low-end component comprises an audio compression codec.

37. The method of claim 32, wherein the low-end component comprises a loudspeaker system or component.

38. The method of claim 32, wherein the low-end component comprises a headphone system or component.

39. The method of claim 32, wherein the high-end component comprises a tube amplifier.

40. The method of claim 1, wherein the high-order perceptual attribute includes at least one of: punch, presence, closeness, warmth, spaciousness, fatness, clarity, or transparency.

41. The method of claim 1, wherein the high-order perceptual attribute includes a characteristic associated with rendered sound that depends on the effects of processing performed on the audio signal prior to it being rendered to the listener.

42. A system for processing an audio signal of a sound recording made available to be rendered to an end user, the audio signal being for at least one channel, the system comprising:

an input connection configured to receive the audio signal of the sound recording; and a processing module configured to:

on a channel by channel basis, analyze the content of the audio signal of the sound recording to determine a modification to the audio signal which when applied causes a high-order perceptual attribute of the audio signal to change; and on a channel by channel basis, change the high-order perceptual attribute of the audio signal as rendered by modifying the audio signal, wherein modifying the audio signal comprises applying to the audio signal the modification based at least in part on said analysis of the content of the audio signal;

wherein the high-order perceptual attribute includes a characteristic associated with rendered sound that depends on (1) the content of the audio signal, including an original sound captured when making the sound recording and any processing performed on the original sound to produce the sound recording, and (2) at least one undesirable artifact introduced by a playback device used to render the audio signal of the sound recording.

43. The system of claim 42, wherein the processing module comprises a processing unit in a consumer electronic device.

44. The system of claim 42, wherein the processing module comprises a processing unit in a consumer electronic device having an audio playback capability.

45. The system of claim 42, wherein the processing module comprises a processing unit in an audio receiver.

46. The system of claim 42, wherein the processing module comprises a processing unit in an audio amplifier.

47. The system of claim 42, wherein the processing module comprises a processing unit in a portable audio device.

48. The system of claim 42, wherein the processing module comprises a processing unit in a wireless device.

49. The system of claim 42, wherein the processing module comprises a processing unit in a CD player.

50. The system of claim 42, wherein the processing module comprises a processing unit in a DVD player.

51. The system of claim 42, wherein the processing module comprises a processing unit integrated with other components onto a single device or printed circuit board.

52. The system of claim 42, wherein the processing module comprises a processing unit in a motherboard.

53. The system of claim 42, wherein the processing module comprises a processing unit in a sound card.

54. The system of claim 42, wherein the processing module comprises a processing unit associated with a home theater system.

55. The system of claim 42, wherein the system comprises a modular component.

56. The system of claim 55, wherein the modular component is configured to receive the audio signal from a receiver, modify the audio signal, and provided the modified audio signal as output to an amplifier.

57. The system of claim 42, wherein the processing module comprises a processor running a computer program.

58. The system of claim 42, wherein the processing module comprises a processor running a driver program.

59. The system of claim 42, wherein the high-order perceptual attribute includes at least one of: punch, presence, closeness, warmth, spaciousness, fatness, clarity, or transparency.

60. A computer program product for processing an audio signal of a sound recording made available to be rendered to an end user, the audio signal being for at least one channel, the computer program product being embodied in a non-transitory computer readable medium and comprising computer executable instructions for causing the computer to perform the steps of:

receiving the audio signal of the sound recording;

analyzing the content of the audio signal of the sound recording to determine a modification to the audio signal which when applied causes a high-order perceptual attribute of the audio signal to change; and changing the high-order perceptual attribute of the audio signal as rendered by modifying the audio signal, wherein modifying the audio signal comprises applying to the audio signal the modification based at least in part on said analysis of the content of the audio signal;

wherein the analyzing and changing steps are performed on the audio signal on a channel by channel basis; and wherein the high-order perceptual attribute includes a characteristic associated with rendered sound that depends on (1) the content of the audio signal, including an original sound captured when making the sound recording and any processing performed on the original sound to produce the sound recording, and (2) at least one undesirable characteristic known to be associated with a playback device used to render the audio signal of the sound recording.

61. The computer program product of claim 60, wherein the high-order perceptual attribute includes at least one of: punch, presence, closeness, warmth, spaciousness, fatness, clarity, or transparency.

62. A method for modifying a transient audio event in an audio signal of a sound recording, the audio signal being for at least one channel, the method comprising:

detecting a transient audio event in a first portion of the audio signal of the sound recording;

determining a graded response to the detected transient audio event which when applied causes a high-order perceptual attribute of the audio signal to change; and modifying said first portion of the audio signal in accordance with the graded response;

wherein the detecting, determining, and modifying steps are performed on the audio signal on a channel by channel basis;

wherein modifying said first portion of the audio signal comprises normalizing a magnitude associated with said first portion of the audio signal and applying a modification to the normalized magnitude, whereby the overall effect of the modification is made independent of the absolute level of the audio signal; and wherein the high-order perceptual attribute includes a characteristic associated with rendered sound that depends on (1) the content of the audio signal, including an original sound captured when making the sound recording and any processing performed on the original sound to produce the sound recording, and (2) at least one undesirable characteristic of a playback device used to render the audio signal of the sound recording.

63. The method of claim 62, wherein normalizing a magnitude associated with said first portion of the audio signal comprises dividing said magnitude by a normalization factor.

64. The method of claim 63, wherein the normalization factor comprises a maximum magnitude value.

65. The method of claim 62, wherein modifying includes using an equation $$S'(\omega, n) = \left[A \cdot \frac{S(\omega, n)}{S_{max}(n)} + 1\right]^{\alpha(n)} - 1,$$

where $S_{max}(n)$ is a maximum magnitude value $S(\omega, n)$ for an $n^{th}$ frame.

* * * * *